United States Patent

[11] 3,579,907

| [72] | Inventor | Rodney J. Graves<br>119 E. Hancock, Williams, Ariz. 86046 |
|---|---|---|
| [21] | Appl. No. | 863,620 |
| [22] | Filed | Oct. 3, 1969 |
| [45] | Patented | May 25, 1971 |

[54] AUTOMATED CONTROLLED ENVIRONMENT FOR CONTINUOUS PRODUCTION OF PLANT LIFE
7 Claims, 6 Drawing Figs.

[52] U.S. Cl.................................................... 47/17,
47/34, 119/3, 119/51
[51] Int. Cl.................................................... A01g 9/18,
A01g 31/00
[50] Field of Search........................................ 46/91, 3;
47/1, 1.2, 1.4, 17, 58; 119/5, 2, 3; 61/1, 2

[56] References Cited
UNITED STATES PATENTS
| 743,820 | 11/1903 | Brown............................ | 46/91UX |
| 2,117,616 | 5/1938 | Levenstein.................... | 119/5UX |
| 2,711,714 | 6/1955 | Timeus......................... | 119/5 |
| 2,732,663 | 1/1956 | Dewey.......................... | 47/1.4 |
| 2,807,912 | 10/1957 | Bjorksten..................... | 47/58 |
| 2,940,214 | 6/1960 | Blanton........................ | 46/91 |
| 3,230,967 | 1/1966 | Castro........................... | 47/1X |
| 3,456,385 | 7/1969 | Plath............................ | 47/1.2 |

FOREIGN PATENTS
| 1,031,309 | 6/1966 | Great Britain................ | 47/1 |
| 1,038,320 | 8/1966 | Great Britain................ | 47/1 |
| 1,053,508 | 1/1967 | Great Britain................ | 47/1 |

*Primary Examiner*—Robert E. Bagwill
*Attorney*—Willard L. Groene

ABSTRACT: An automated controlled environment system for the continuous production of plants in which there is provided a cool, low-light environmental unit for the production of hydroponic oat, barley and the like grass plants.

INVENTOR.
RODNEY J. GRAVES.
BY
Willard S. Grout
ATTORNEY.

PATENTED MAY 25 1971
3,579,907
SHEET 2 OF 3
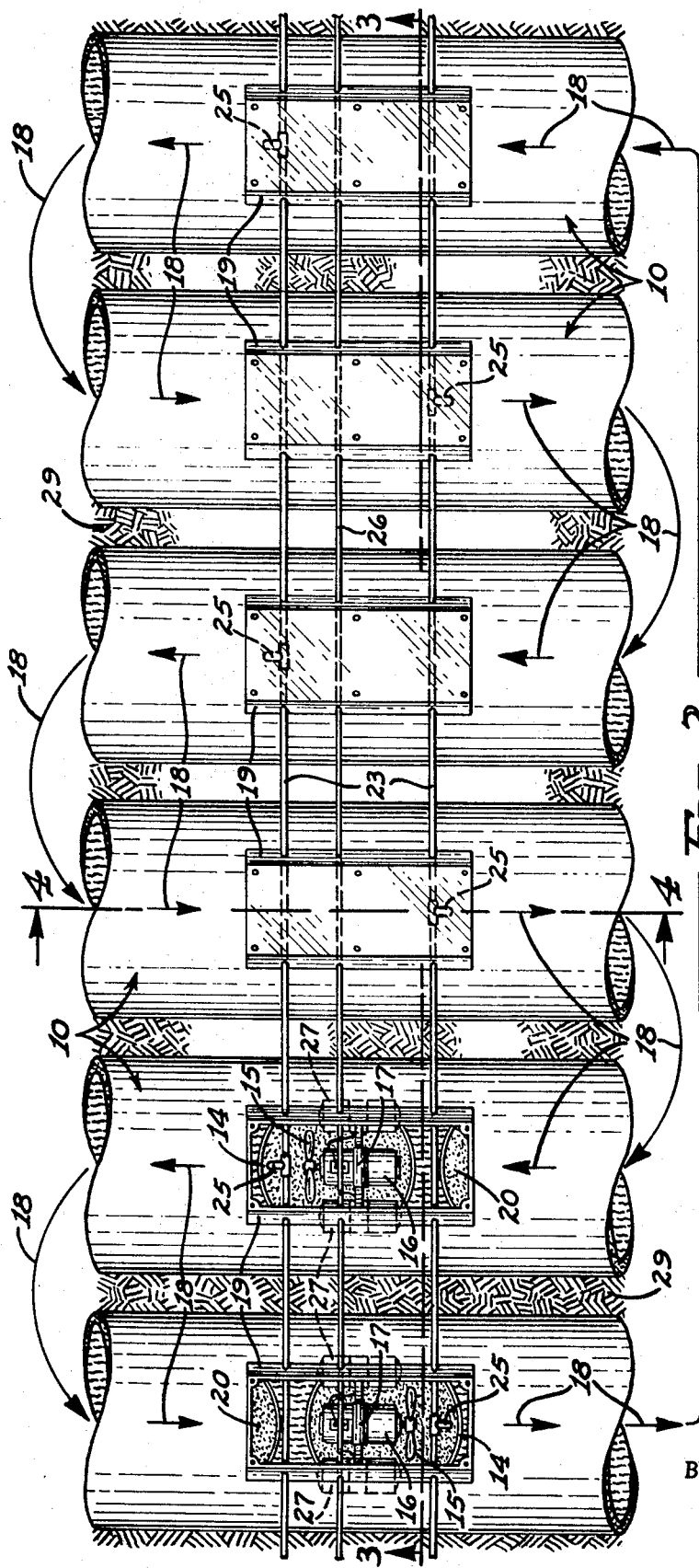
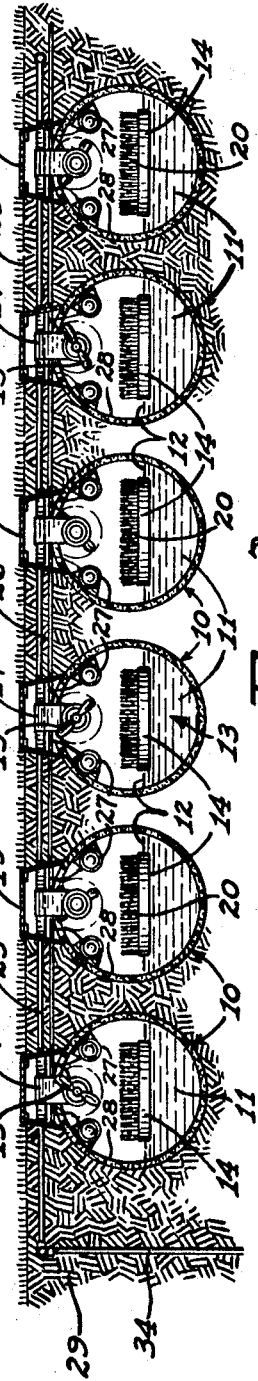
INVENTOR.
RODNEY J. GRAVES
BY
Willard S. Groene
ATTORNEY.

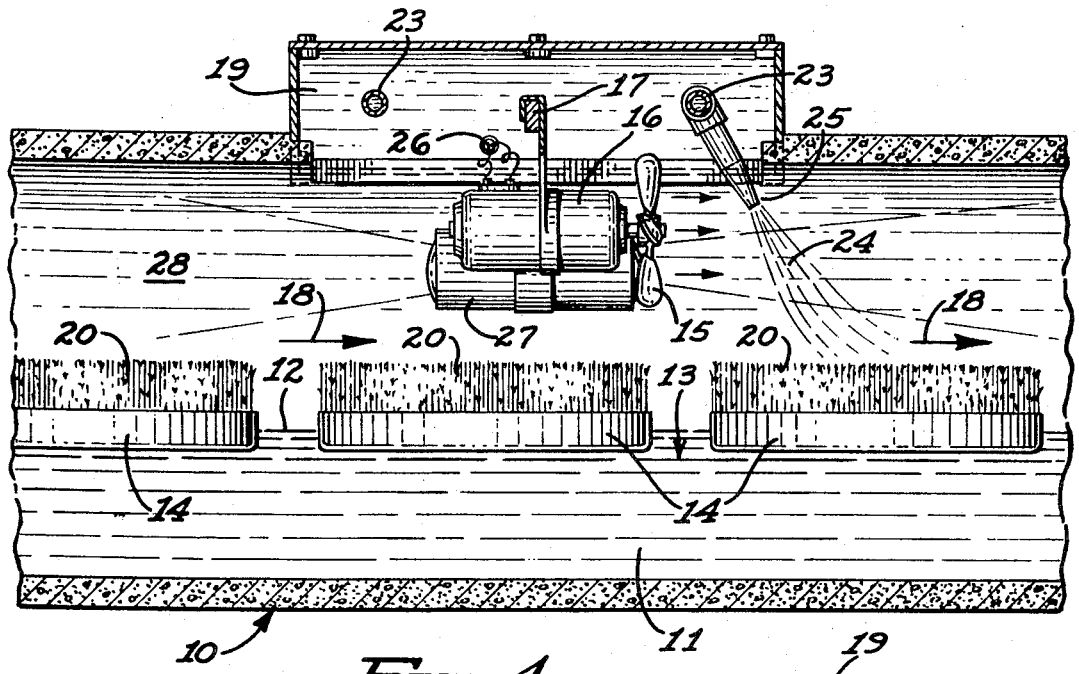
Fig. 4
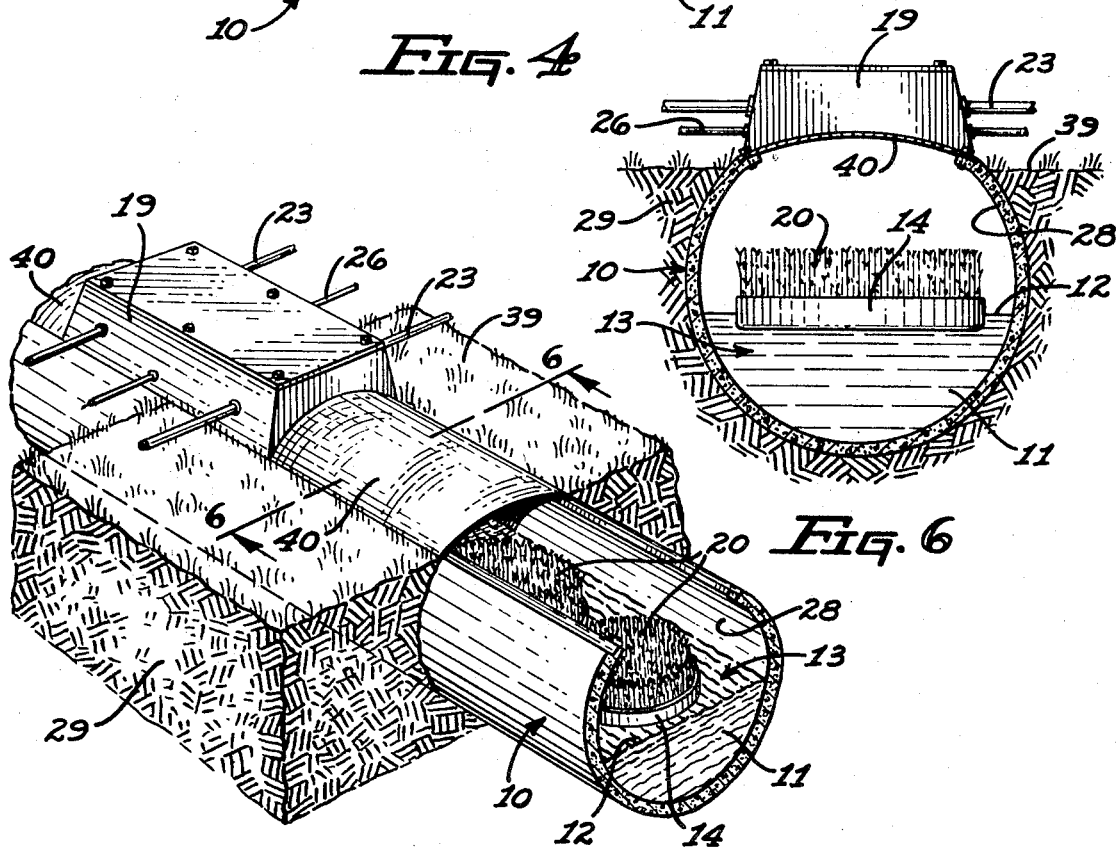
Fig. 5
Fig. 6
INVENTOR.
RODNEY J. GRAVES.
BY
Willard S Grout
ATTORNEY.

AUTOMATED CONTROLLED ENVIRONMENT FOR CONTINUOUS PRODUCTION OF PLANT LIFE

BACKGROUND OF THE INVENTION

This invention pertains to automated controlled environment plant growth system, and is particularly directed to a cool, low-light environmental system for the production of hydroponic oat or barley grass.

Manmade environments, isolated from climate and controlled for the cultivation and growth of plant life, have existed for some years. Plants have been nurtured from soil and exclusively from liquids, i.e. by hydroponics. The quest for systems that assure germination, maturation and harvest on a daily basis, year around, still continues.

Vegetation requires surface areas, often large ones. Getting supplies to individual plants requires extensive layouts of repeated facilities, such as delivery of water, nutrients, and antiseptics. Planting and harvesting require travel to and from plants and require careful labor.

Greenhouse walls which must pass sunlight are poor insulators, resulting in high costs for temperature control. Increased numbers of plants per area for greater yields leads to problems in the distribution of sunlight.

SUMMARY OF THE INVENTION

One of the objects of this invention is to provide automation for planting and harvesting operations.

Another object is to transport the vegetation progressively through a controlled environment.

Still another object is to provide assembly line style delivery of supplies to the passing vegetation.

It is also an object to provide a self supporting, insulating environmental barrier.

Another object is to have maximum utilization of light sources and a reduced amount of fixtures for distributing the light.

The provision of a central atmosphere monitoring and air conditioning, and central liquid and nutrient monitoring and conditioning system.

And a further object is to provide an easily maintained sanitary environment for the operations.

BRIEF DESCRIPTION OF THE DRAWINGS

FIG. 2 is an enlarged fragmentary plan view of the utility housing arrangement of the system shown in FIG. 1.

FIG. 3 is a sectional view on the line 3—3 of FIG. 2.

FIG. 4 is an enlarged sectional view on the line 4—4 of FIG. 3.

FIG. 5 is an enlarged fragmentary perspective view of a modification to underground operation for the above shown arrangement.

FIG. 6 is a sectional view on the line 6—6 of FIG. 5.

DESCRIPTION OF THE PREFERRED EMBODIMENT

Figure 1:
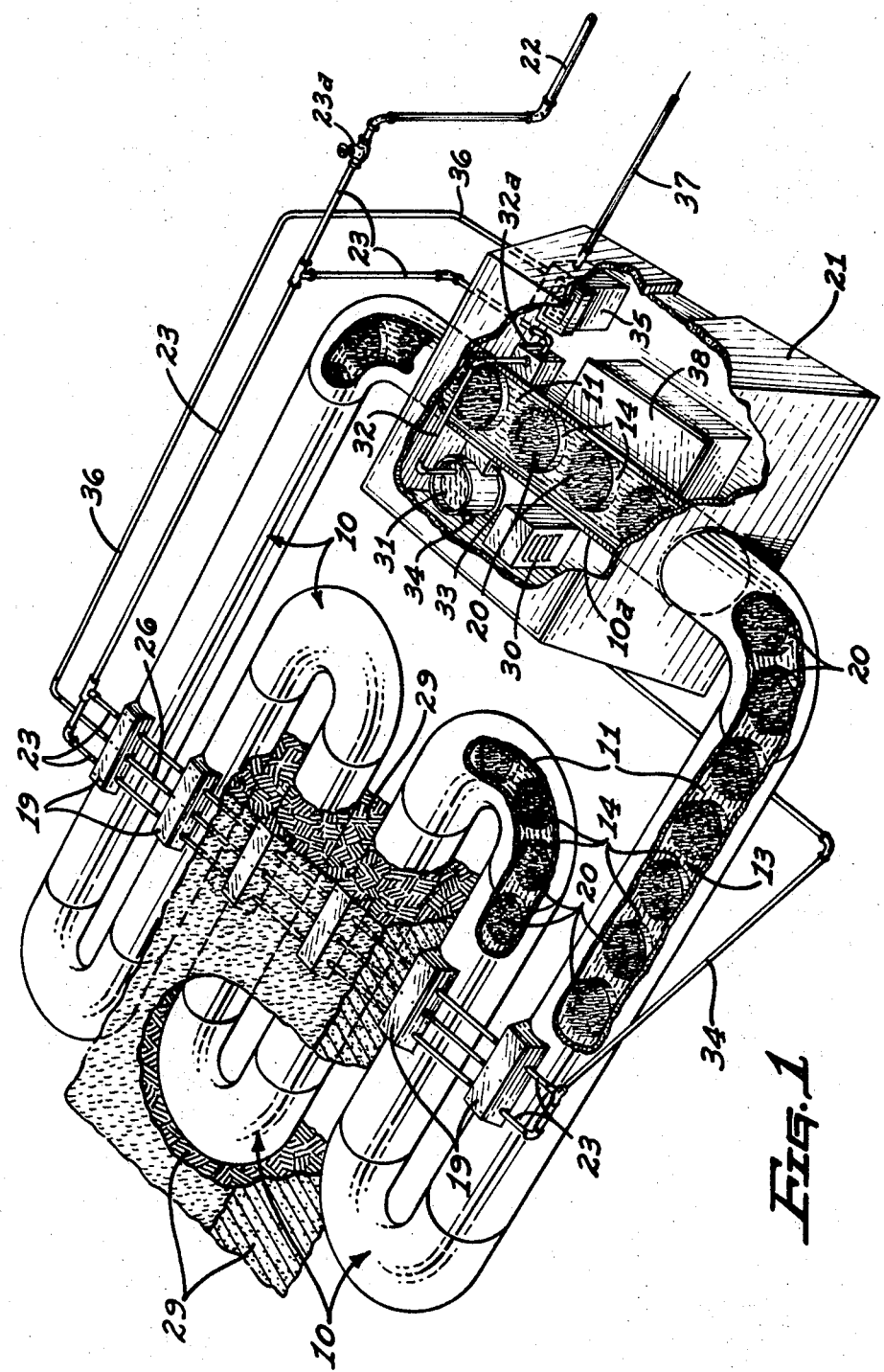
FIG. 1 is a general perspective view, partly broken away, showing the complete operative system of this invention.

As an example of one embodiment of this invention, there is shown a horizontally disposed tubular structure 10 which is filled with water 11 to a level 12 slightly under the horizontal diameter of the tube 10 to provide the pool 13. Round buoyant plastic trays 14 containing living plants float on the surface 12 of the pool 13. A blower fan 15 driven by a suitable drive motor 16 mounted on the bracket 17 on the tubular structure 10 sends a flow of air through the tube.

Pressure exerted by the airflow on the surfaces of the trays 14 and their plant cargo, in combination with the low frictional relationship between the trays and the water, causes them to float along through the tubular structure 10, the tubular structure preferably being an endless undulating conduit to provide an enclosed system. The various fans 15 are appropriately positioned to cause the air to circulate in one direction as shown by the direction arrows 18, the fans in immediately adjacent tubes facing in opposite directions so that a continuous airflow direction will result.

The buoyant plastic trays 14 are preferably of round design to facilitate the transport of a series of trays around 180° turns in the tubular structure 10 without catching or hanging up. Also, the frictional relationship between adjacent trays or individual trays and the wall of the tube is minimal as is demonstrated by the tangency of a circle and straight line, or adjacent circles.

A series of facility housings 19, FIGS. 1, 2 and 3, each contains a fan 15. With all fans running at one time, energy will be evenly dispersed throughout the system and all trays 14 floating within the tubes will eventually go the full cycle. All trays carrying their plants 20, the volume of the atmosphere, and the liquid distributed throughout the tubes are destined to pass through the building 21 which is in a position within the cycle. The series of facility housings 19 mounted on the tubular structure 10, FIGS. 1, 2 and 3, have pipe lines 23 carrying liquid nutrient 24 to spray nozzles 25 which point downwind in opposite directions in adjacent tubes. Conduit 26 carries the electrical conductors for energizing the fans 15 and lighting fixtures 27 mounted in the top portions of the tubes which send light beams in both directions in all tubes.

When the fans 15 are running, causing the trays to circulate through the tubular structure, the liquid nutrient spray system is activated. The trays pass under the spray nozzles 25 in assembly line fashion. With the nozzle 25 positioned in each row, all trays in the system need move only the length of one tube to service all the trays in the system with nutrient. The lights in combination with a white enameled surface 28 of the inside of the tubular structure 10 reflect the beam through the length of the tube, the concave inner surface of the tube providing maximum utilization of the light source to thereby greatly reduce the amount of wiring and fixtures the system will require.

In FIGS. 1, 2 and 3, the tubular structure has an insulative cover of earth 29 with erosion-resistant turf providing a good insulator. The tubular structure 10 is preferably formed of concrete pipe providing a self-supporting structure as an excellent environmental barrier and having qualities harmonious with the requirements of the flotation pool, airflow cycle, tray movement, and maximum lighting efficiency.

The building 21 is part of the environmental circuit and is the operations center for the complex. Atmosphere-conditioning unit 30 acts upon the air volume passing through the room in compliance with the circulation of the whole system. From this point atmosphere content such as humidity, gases and temperature may be monitored and altered to the requirements of the plant life.

The central nutrient system consists of the mixing reservoir 31, connected through line 32 to the high pressure pump 32d discharging into the piping system 23. Water as required may be added to the nutrient lines 23 through the supply main 22 and controlled by valve 23d. Nutrient is recycled from the system by way of the conditioning reservoir through conduit 33, and recirculated from piping 23 return via line 34. The entire system is suitably controlled from the electric distribution panel 35 with a feed circuit 36 and power supply line 37.

A work deck 38 is provided adjacent the semitubular portion 10a of tubular structure 10, which extends through building 21, to facilitate the planting and harvesting particular varieties of plant life. The trays 14 are easily accessible for removal from and replacement into the travel channel 11 of the flotation pool. Because of the momentum of the trays 14 throughout the system, the flotation pool 13 will exhibit directional circulation also. This factor eliminates the need of additional motive devices within the operations building.

A significant issue in the search for a practical means to automate the production of living plants has been concern for maintaining a sanitary environment. The prospects of applying conventional machinery such as conveyor belts, gears, cam shafts and the like have not been promising because of their susceptibility to collection of organic debris. The growth of detrimental bacteria is a major concern. The nonmechanical nature of this system offers important advantages for the attainment of automated clean environments.

FIGS. 5 and 6 illustrate how the tubular structure would be altered for growing plants requiring a warm and well-lighted environment. The environmental barrier of concrete pipe 10 which is cast as a semienclosure is surrounded with earth insulation 29 to the level of the plastic window cover 40. The inner surface 28 of the pipe is enameled with a reflective surface. The value of high insulation and maximum light utilization have not been given up and in the warm, well-lighted environment, would utilize the same features and design that were presented in displaying the cool, low-light environment of FIGS. 1 to 4.

I claim:

1. An automated controlled environment apparatus for continuous production of plant life comprising:
    A. an elongated horizontally disposed conduit,
    B. a flotation pool of water of a predetermined depth in the lower portion of the conduit,
    C. buoyant plant supporting elements floating on the surface of the pool,
    D. and air circulating means within the conduit adapted to produce air movement longitudinally of the conduit over the pool surface to move the plant-supporting elements along the pool surface.

2. An automated controlled environment apparatus as in claim 1 wherein the conduit comprises an elongated tubular structure.

3. An automated controlled environment apparatus as in claim 1 wherein the plant supporting elements comprise round buoyant trays.

4. An automated controlled environment apparatus as in claim 1 wherein the air circulating element comprises a power driven fan discharging air longitudinally of the tubular member over the water surface of the pool.

5. An automated controlled environment apparatus as in claim 1 wherein the conduit comprises an endless tubular member.

6. An automated controlled environment apparatus as in claim 1 wherein nutrient discharge nozzles and lighting fixtures are provided at spaced intervals along the top portion of the conduit.

7. An automated controlled environment apparatus as in claim 1 wherein a work deck is provided adjacent the conduit to facilitate the planting and harvesting of the plant life in the plant-supporting elements and the removal from and replacement of the plant-supporting and carrying elements in the travel channel of the flotation pool.